United States Patent
Levasseur et al.

(10) Patent No.: US 10,427,383 B2
(45) Date of Patent: Oct. 1, 2019

(54) COLD BENDING OF A LAMINATED GLAZING

(71) Applicant: SAINT-GOBAIN GLASS FRANCE, Courbevoie (FR)

(72) Inventors: Fabien Levasseur, Tourcoing (FR); Romain Decourcelle, Compiegne (FR); Christophe Swiderski, Amigny-Rouy (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 951 days.

(21) Appl. No.: 14/358,903

(22) PCT Filed: Nov. 13, 2012

(86) PCT No.: PCT/FR2012/052607
§ 371 (c)(1),
(2) Date: May 16, 2014

(87) PCT Pub. No.: WO2013/072611
PCT Pub. Date: May 23, 2013

(65) Prior Publication Data
US 2014/0312518 A1 Oct. 23, 2014

(30) Foreign Application Priority Data

Nov. 17, 2011 (FR) ..................................... 11 60473

(51) Int. Cl.
*E06B 3/673* (2006.01)
*E06B 3/66* (2006.01)
(Continued)

(52) U.S. Cl.
CPC ...... *B32B 17/10055* (2013.01); *B23P 11/025* (2013.01); *B29C 53/04* (2013.01);
(Continued)

(58) Field of Classification Search
CPC ......... E06B 3/66; E06B 3/673; E06B 3/67386
See application file for complete search history.

(56) References Cited

U.S. PATENT DOCUMENTS 4,367,108 A * 1/1983 Valimont ............ B29C 65/3444
156/104
4,899,507 A * 2/1990 Mairlot ............. B32B 17/10036
52/204.5

(Continued)

FOREIGN PATENT DOCUMENTS

DE          195 19 504        11/1996
DE      10 2008 031 770        1/2010

(Continued)

OTHER PUBLICATIONS

Belis et al. "Cold Bending of Lamianted Glass Panels". Heron, vol. 52., p. 123-146, 2007. Retrieved via online search on Mar. 31, 2017. http://heronjournal.nl/52-12/6.pdf.*

(Continued)

*Primary Examiner* — Christopher T Schatz
(74) *Attorney, Agent, or Firm* — Oblon, McClelland, Maier & Neustadt, L.L.P.

(57) ABSTRACT

The invention relates to a process for the preparation of bent glazed modules comprising a metal framework and a panel comprising a laminated glazing comprising glass substrates separated by an interlayer made of polymer material, the panel being bent, after the laminated glazing has been assembled, by a force which causes it to take the shape of the metal framework and then held in this shape by a holding means, the bending being carried out while the interlayer is at a temperature between 30 and 80° C. The invention reduces the loads necessary for the bending and also the shear stresses between the interlayer made of polymer material and the glass substrates, which reduces the risks of delamination.

16 Claims, 2 Drawing Sheets

(51) Int. Cl.

| | |
|---|---|
| *E06B 3/663* | (2006.01) |
| *E06B 3/677* | (2006.01) |
| *B32B 17/10* | (2006.01) |
| *B32B 7/12* | (2006.01) |
| *B23P 11/02* | (2006.01) |
| *B29C 53/04* | (2006.01) |
| *B32B 38/00* | (2006.01) |

(52) U.S. Cl.
CPC .......... *B32B 7/12* (2013.01); *B32B 17/10036* (2013.01); *B32B 17/10091* (2013.01); *B32B 17/1099* (2013.01); *B32B 17/10137* (2013.01); *B32B 17/10293* (2013.01); *B32B 17/10761* (2013.01); *B32B 17/10889* (2013.01); *B32B 38/0012* (2013.01); *E06B 3/66* (2013.01); *E06B 3/66314* (2013.01); *E06B 3/677* (2013.01); *E06B 3/6736* (2013.01); *E06B 3/67326* (2013.01); *E06B 3/67386* (2013.01); *B32B 2038/006* (2013.01); *B32B 2307/7265* (2013.01); *E06B 3/673* (2013.01); *E06B 2003/67395* (2013.01); *Y10T 29/49865* (2015.01)

(56) References Cited

U.S. PATENT DOCUMENTS 6,076,373 A * 6/2000 Grodziski ........... C03B 23/0252
65/107

2007/0193218 A1 * 8/2007 Spransy ................ E04B 2/7453
52/782.1

FOREIGN PATENT DOCUMENTS

| EP | 0 282 468 | 9/1988 |
|---|---|---|
| FR | 2 676 049 | 11/1992 |
| NL | 1 029 935 | 5/2007 |
| WO | 98 01649 | 1/1998 |

OTHER PUBLICATIONS

Zickel, M.J., et al., "Residual Stress Measurement of Automobile Windshields Using the Grey-field Polariscope", SEM Extended Abstract, URL: www.stressphotonics.com/PSA/psa_pdfs/SEM99Windshield.pdf, Total 4 Pages, (Jun. 7-9, 1999) XP002677516.

International Search Report dated Jan. 23, 2013 in PCT/FR12/052607 Filed Nov. 13, 2012.

U.S. Appl. No. 14/358,929, filed May 16, 2014, Levasseur, et al.

Combined Chinese Office Action and Search Report dated Dec. 3, 2014 in Patent Application No. 201280056794.2 (with English language translation).

Ying-chun Ou, "Effects of surface properties of glass and film, and the interface properties on the adhesion of laminated glass" Chinese Doctoral Dissertations & Master's Theses Full-text Database (Master) Engineering Science and Technology I, Mar. 2004, 18 Pages (with English language translation).

* cited by examiner

COLD BENDING OF A LAMINATED GLAZING

CROSS REFERENCE TO RELATED APPLICATIONS

The present application is a 35 U.S.C. § 371 national stage patent application of International patent application PCT/FR2012/052607, filed on Nov. 13, 2012, published as WO 2013/072611 on May 23, 2013, the text of which is incorporated by reference, and claims the benefit of the filing date of French application no. 1160473, filed on Nov. 17, 2011, the text of which is also incorporated by reference.

The invention relates to a process for the cold bending of a panel comprising a laminated glazing.

A laminated glazing comprises several glass substrates separated by an interlayer made of polymer material. A glass substrate comprises a single sheet of mineral glass, if appropriate covered with one or more layers of the following types: antireflection, solar-protection, abrasion-resistant, and the like.

The preparation of flat laminated glazings is well controlled. The preparation of bent glazings is much more problematic and increasingly problematic as the curvatures to be conferred increase. If the curvatures are high, the hot bending beforehand of the glass sheets when the glass is soft (generally at greater than 500° C.) may be necessary. If the curvatures of a glazing are not very great, it is possible to envisage cold bending it after the end of the manufacture thereof. The expression "cold bending" generally means at less than 200° C., at which temperature the glass is not soft.

EP 282 468 teaches the bending between 80 and 140° C. of a laminated glazing comprising a tempered glass substrate. Heating between 80 and 140° C. serves to soften the interlayer PVB of the laminated glazing.

It has now been discovered that cold bending above 80° C. results in an unacceptable aging of the interlayer made of polymer material, which is reflected by the formation of fine bubbles but ones visible to the naked eye, and furthermore that it is advantageously possible to carry out the cold bending between 30 and 80° C., to reduce the loads necessary for the bending and also the shear stresses between the interlayer made of polymer material and the glass substrates and thus reduce the risks of delamination.

The invention relates to a process for bending a panel comprising a laminated glazing between 30 and 80° C. A temperature above 40° C. is particularly satisfactory. A temperature below 75° C. is general suitable. The temperature range between 40 and 75° C. is particularly suitable. In order to carry out this process, in practice, first a flat panel is heated until the interlayer reaches the recommended temperature range (bending temperature) and then the panel is bent. Preferably, the panel is heated above the glass transition temperature of the interlayer made of polymer material. The glass transition temperature is determined by viscoanalysis with kinetic measurements. The fact of heating above the glass transition is favorable to the creep of the polymer material during the bending, which has the consequence that the permanent shear stresses at the interfaces between said material and the glass substrates are reduced. The interlayer made of polymer material can in particular be a polyvinyl butyral (referred to as "PVB"), an ethylene/vinyl acetate or a film of ionomer resin, in particular SentryGlas sold by DuPont. For the case of an ionomer resin, it is preferable to heat the panel to more than 45° C.

The cold bending of the panel results in the cold bending of the laminated glazing of the panel. The panel can comprise another component than the laminated glazing, such as a sheet parallel to the laminated glazing. In particular, the panel can be the laminated glazing itself.

In order to heat the panel between 30 and 80° C., it is possible to very easily operate by juxtaposing a heating element, such as, for example, a heating blanket, with a panel. Use may in particular be made, as heating blanket, of those sold by Vulcanic. It is possible simply to cover the panel with the heating element, until the desired temperature is obtained, and to proceed to the bending. It is possible to leave the heating element juxtaposed with the panel during the bending. It is possible to start heating up a panel by the heating element while carrying out the bending of another panel which has just been heated. Of course, a person skilled in the art knows, as a function of the nature of the glazing and of its dimensions (main faces and thickness), how to find the heating, duration and rate conditions regarding each operation in order to optimize the process.

The process according to the invention is suitable for the cold bending of panels comprising a laminated glazing. In particular, all the glass sheets present in the panel can be tempered. The invention is particularly suitable for the cold bending of a panel consisting of a laminated glazing comprising two tempered glass sheets separated by an interlayer made of polymer material.

In particular, the invention is of particular use in the preparation of glazings which have to be fitted to buildings, the glazings of which have to appear curved. These buildings, in particular of the type consisting of high-raise buildings of business districts, can have particularly bold shapes and may require the preparation of curved panels having shapes which may be different from one to the other for one and the same building.

Thus, the invention relates to a process for the preparation of a bent glazed module comprising a metal framework and a panel comprising a laminated glazing comprising glass substrates separated by an interlayer made of polymer material, the panel being bent, after the laminated glazing has been assembled, by a force which causes it to take the shape of the metal framework and then held in this shape by a holding means, the bending being carried out while the interlayer is at a temperature between 30 and 80° C.

Modules are produced which comprise the panel comprising the laminated glazing and a metal framework capable of holding in shape the cold-bent panel and thus acting as mold. This metal framework is generally made of steel or extruded aluminum. To do this, the panel can be preheated to between 30 and 80° C., in particular by placing it on a heating blanket, then it is brought into contact with the metal framework and a force is applied to the panel at one or more points in order to cause it to take the shape of the framework. The forces applied can range, for example, up to 200 kg per point of contact. Use may be made, in order to carry out this deformation of the panel, of tie rods, hydraulic jacks, weights or robots. The panel is held in shape on the framework by a holding means, such as clamps, or by an adhesive, according to the radius of curvature to be maintained. Of course, if adhesive bonding is concerned, a waiting period is required for the adhesive to have set well (by polymerization, crosslinking, and the like) before removing the force by which the panel is applied to the framework. A suitable structural adhesive is, for example, that of the silicone type sold by Dow Corning under the reference DC 3362. If the curvature to be maintained is high, the use of clamps may be essential. By virtue of the invention, the bending operation itself (between the start of the deformation and the end of the deformation of the panel) can be fast, in particular between 10 and 120 seconds.

The "cold" deformation of the panel must not be carried out while generating unacceptable stresses in the glass sheets of which it is composed. Thus, the maximum permanent stress allowed in the construction industry for a glass which has not been tempered is 10 MPa. The maximum permanent stress allowed in the construction industry for a tempered glass is 40 MPa. According to the curvatures to be conferred on the panel, it may thus be advantageous to use tempered glass sheets assembled in a laminated glazing.

In particular, the panel may be bent simultaneously along two different directions (twisted glass).

The panels to which the invention relates can be large, since they can have a main face with an area of greater than 3 $m^2$ and even of greater than 4 $m^2$ and even of greater than 5 $m^2$. It should be noted that a panel (and also a sheet or a glazing) comprises two main faces and an edge.

It is advisable during the bending not to exceed the maximum acceptable stresses of the glazing in use. It has been discovered that the most critical factor limiting the amplitude of the bending is the shear stress at the interfaces between the interlayer made of polymer material and the glass substrates which are juxtaposed with it. Preferably, the laminating glazing is bent in order for this stress at 20° C. to be less than 3 MPa and preferably less than 2 MPa and more preferably less than 1.5 MPa. As, according to the invention, the interlayer made of polymer material is heated to more than 30° C., the shear stress at interfaces experienced during the bending is much lower than that which may be experienced in use when ambient temperatures fall. This is why, before carrying out the bending, it is advisable to determine, by routine tests, whether the anticipated bending does not exceed the shear stress at the interfaces between the interlayer made of polymer material and the glass substrates at 20° C. This expert appraisal can be carried out very simply by a method also forming the subject matter of the invention. According to this method, these shear stresses can be displayed by juxtaposing, with the laminated glazing, a polarizing film on one of its main faces. After having positioned this polarizing film on a sample of the laminated glazing, a tensile test is carried out by pulling, on one side, on one of the glass substrates and, on the other, on the other glass substrate. The appearance of the stresses is reflected by a coloration in transmission. The coloration changes with the intensity of the stresses. It is thus sufficient to pinpoint the color corresponding to the maximum stress allowed, as the case may be (3 or 2 or 1.5 or 1 MPa, or other). This calibrating can be carried out with just one polarizing film juxtaposed with a main face of the laminated glazing. In this case, the coloration should be observed with a viewing angle of approximately 45° (angle between the normal to the glazing and the direction of viewing). It is also possible to place a film on each of the main faces of the laminated glazing, in which case the stresses can be displayed with any angle of observation. After carrying out the calibration (for a given interlayer made of polymer material and a given thickness of said interlayer), it can easily be confirmed, in production of the glazings, that the maximum shear stresses are not exceeded by affixing a polarizing film to a main face of the glazing or two polarizing films, one on each of the main faces of the glazing. Thus, the invention also relates to the process according to which, after bending according to the invention and returning the interlayer to the temperature of 20° C., the state of the shear stresses at the interfaces between the interlayer made of polymer material and the glass substrates located on either side of the polymer material on being juxtaposed with it is evaluated by applying a polarizing film to a main face of the panel and then by displaying the color transmitted through the panel and the film. This color can subsequently be compared with the colors of the calibration carried out beforehand in order to evaluate the shear stresses of the interfaces between the interlayer made of polymer material and said glass substrates and, according to the result of this comparison, to decide on the conformity of the module with respect to the specifications, that is to say to validate or discard the module.

EXAMPLES

Figure 1:
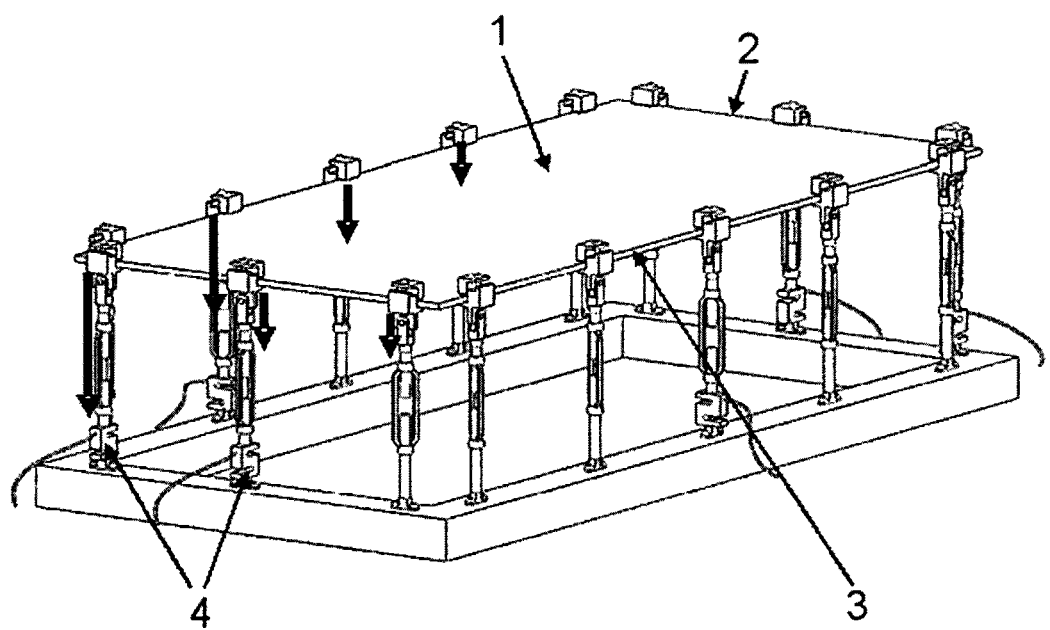
FIG. 1 represents a device which makes it possible to apply deformations to a glazing and to measure the stresses experienced.
Figure 2:
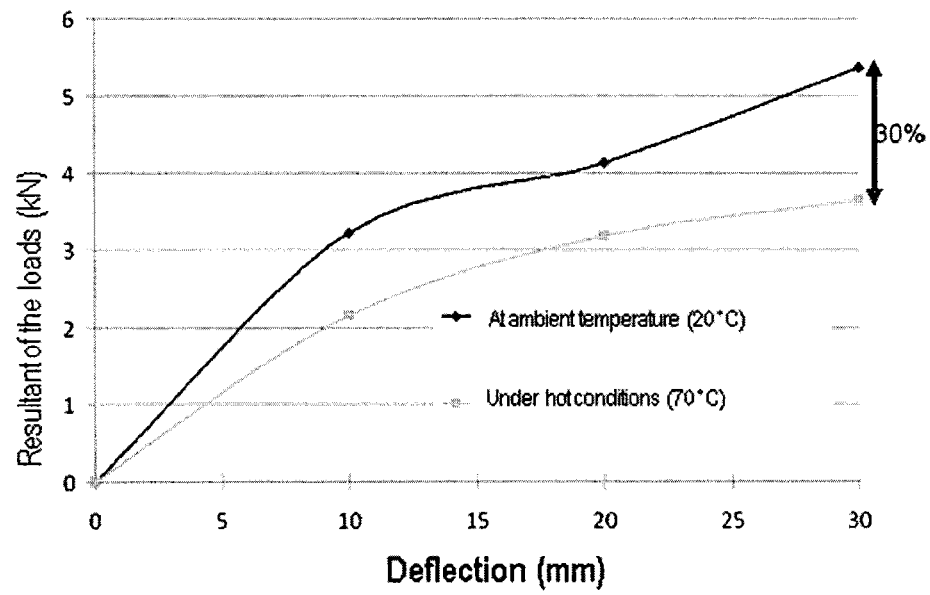
FIG. 2 represents the sum of the absolute values of the forces measured in two cases of temperatures (20 and 70° C.) as a function of the deflection imposed on the glazing by the device of FIG. 1.
Figure 3:
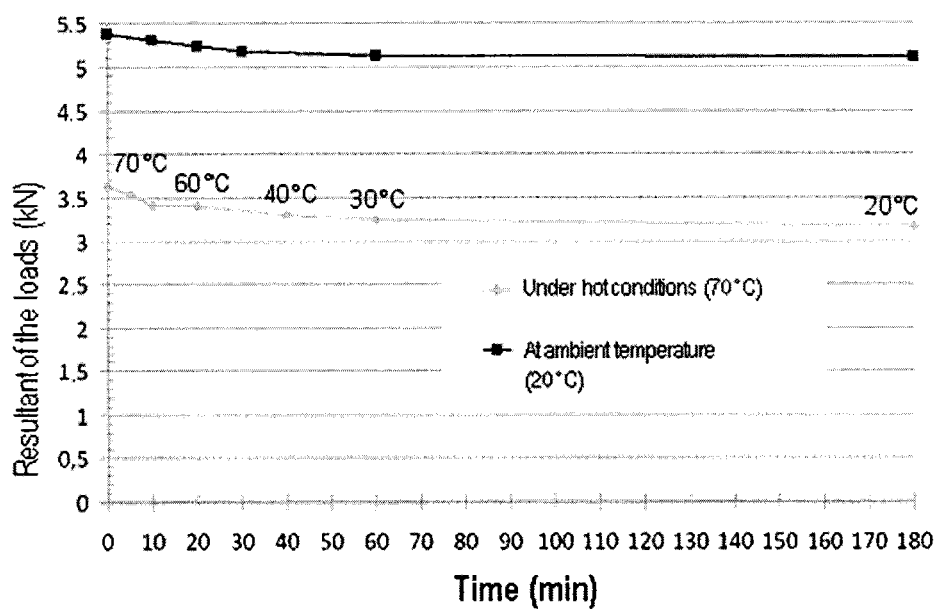
FIG. 3 shows the change over time in the sum of the absolute values of the forces in both cases of temperatures of application of deformations (20 and 70° C.).

A tempered laminated glazing is manufactured by combining 2 tempered monolithic glazings, each at 120 MPa of compressing of the skins, each glazing having dimensions of 1938×876×8 mm, with 4 PVB interlayers (4 times 0.38 mm of PVB thickness). The glazing is subsequently subjected to a deformation as represented in FIG. 1. A fixed width 2 and a fixed length 3 of the glazing 1 are maintained and displacements are applied to the sides not kept fixed, as represented in FIG. 1, via vertical vectors directed downward. This was carried out after having brought the assembled glazing to the temperatures of 20° C. in one case and 70° C. in another case. Force sensors 4 placed under the tie rods exerting the displacements make it possible to measure the forces applied at different points of the periphery of the glazing. At some points, the forces are in tension and at other points the forces are in compression, so that the resultant is zero. The loads endured by the glazing are thus assessed by adding the absolute values of the forces. FIG. 2 represents the sum of the absolute values of the forces measured in both cases of temperature and as a function of the deflection. It is seen that the heating at 70° C. makes possible a reduction in the loads of the order of 30%. FIG. 3 shows the change in the sum of the absolute values of the forces as a function of the time, it being known that, for the test with preheating to 70° C., the glazing is immediately placed back in ambient air at 20° C. The fall in temperature of the glazing between 70 and 20° C. has been shown as a function of the time. It is seen that the resultant of the forces remains much lower in the case of preheating to 70° C., the saving of 30% being retained and even improved if the glazing deformed at 20° C. and that deformed at 70° C. and returned to 20° C. are compared. The interlayer in the case of the preheating to 70° C. will consequently age better, have less tendency to delaminate and have less tendency to turn white.

The invention claimed is:

1. A process for preparing a bent glazed module comprising a metal framework and a twisted glass panel comprising a laminated glazing comprising twisted glass substrates separated by an interlayer made of polymer material, the method comprising:

bending a panel comprising a laminated glazing comprising glass substrates separated by an interlayer made of polymer material simultaneously along two different directions by a force which causes it to take a shape of the metal framework, thereby providing the twisted glass panel; and then, holding the panel in the shape with a holder, thereby providing the bent glazed module, wherein the bending is carried out while the interlayer is at a temperature between 30 and 80° C.

2. The process of claim 1, wherein the bending is carried out while the interlayer is at a temperature of greater than 40° C.

3. The process of claim 1, wherein the bending is carried out while the interlayer is at a temperature of less than 75° C.

4. The process of claim 1, wherein the interlayer is at a temperature greater than its glass transition temperature during the bending.

5. The process of claim 1, wherein the interlayer is a PVB.

6. The process of claim 1, wherein at least one of said glass substrates comprises a sheet of tempered glass.

7. The process of claim 6, wherein all the glass substrates are tempered glass sheets.

8. The process of claim 1, wherein the panel is heated by juxtaposing a heating element with the panel.

9. The process of claim 8, wherein the heating element is a heating blanket.

10. The process of claim 1, wherein the bending lasts between 10 and 120 seconds.

11. The process of claim 1, wherein the panel is bent in order for shear stress at interfaces between the interlayer made of polymer material and the glass substrates which are juxtaposed with it to be less than 3 MPa at 20° C.

12. The process of claim 1, wherein the panel has a main face with an area of greater than 3 $m^2$.

13. The process of claim 1, wherein the panel has a main face with an area of greater than 4 $m^2$.

14. The process of claim 1, wherein the panel has a main face with an area of greater than 5 $m^2$.

15. The process of claim 1, wherein the holder is a clamp.

16. The process of claim 1, wherein the holder is an adhesive.

* * * * *

UNITED STATES PATENT AND TRADEMARK OFFICE
CERTIFICATE OF CORRECTION

Page 1 of 1

PATENT NO. : 10,427,383 B2
APPLICATION NO. : 14/358903
DATED : October 1, 2019
INVENTOR(S) : Fabien Levasseur et al.

It is certified that error appears in the above-identified patent and that said Letters Patent is hereby corrected as shown below:

On the Title Page
Column 2, item (56), Other Publications, Line 1, "Lamianted" should read --Laminated--

Signed and Sealed this
Twenty-fourth Day of March, 2020

Andrei Iancu
*Director of the United States Patent and Trademark Office*